Figure 1:
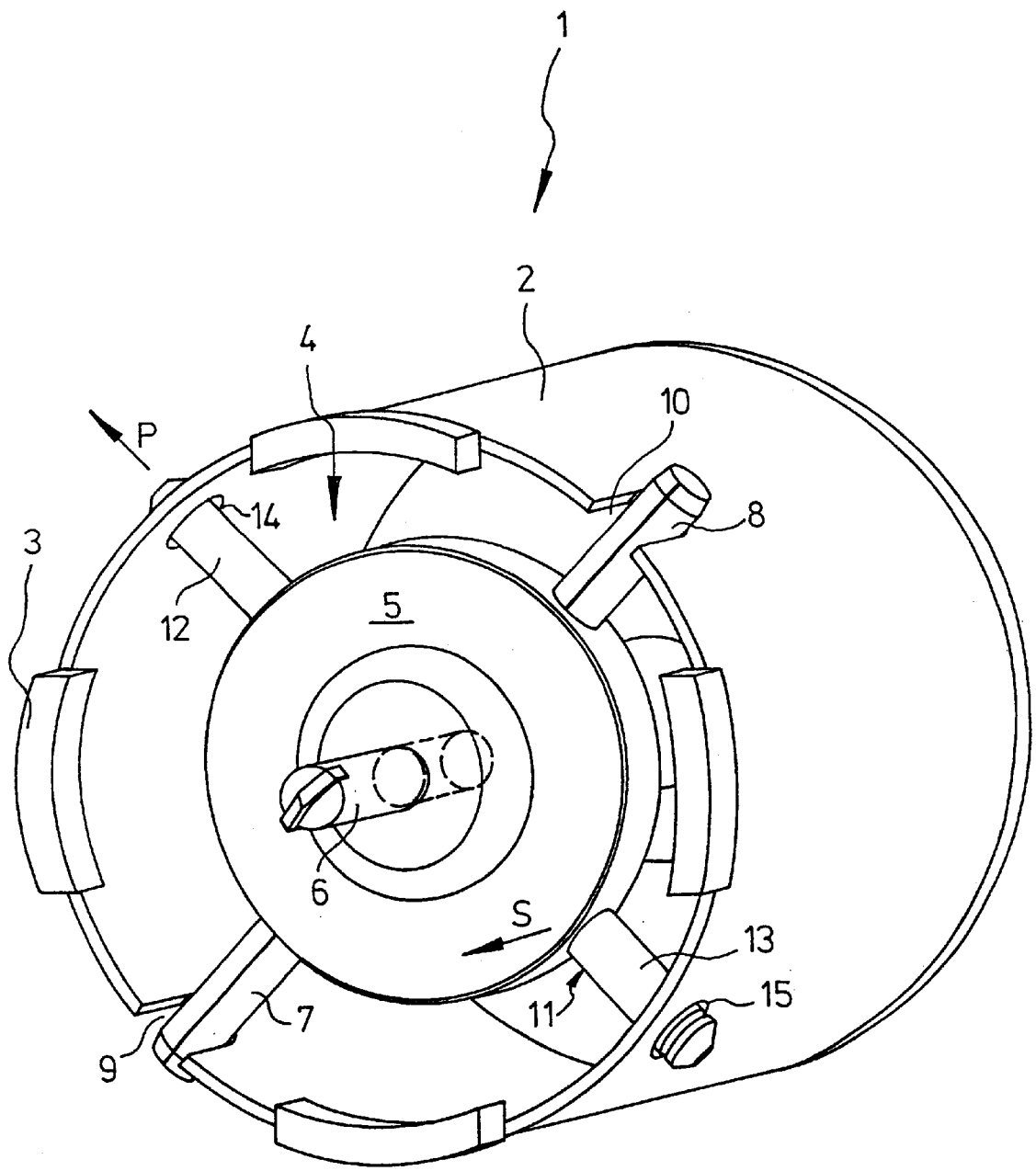

United States Patent [19]
Meyen et al.

[11] Patent Number: 5,931,614
[45] Date of Patent: Aug. 3, 1999

[54] ANNULAR BIT HAVING A CENTER DRILL

[75] Inventors: Hans-Peter Meyen, Wolpertswende; Bernhard Moser, Altshausen, both of Germany

[73] Assignee: Hawera Probst GmbH, Ravensburg, Germany

[21] Appl. No.: 08/816,801

[22] Filed: Mar. 19, 1997

[30]     Foreign Application Priority Data

Apr. 1, 1996 [DE] Germany ............................ 196 13 102
  Jul. 24, 1996 [DE] Germany ............................ 196 29 837

[51] Int. Cl.$^6$ .................................................. B23B 51/04
[52] U.S. Cl. ............................ 408/201; 408/206; 175/386
[58] Field of Search ............................... 408/75, 201, 204, 408/206, 225, 703; 175/386, 403, 408

[56]             References Cited

U.S. PATENT DOCUMENTS

| | | | |
|---|---|---|---|
| 2,673,717 | 3/1954 | Bacon ...................................... | 175/386 |
| 2,816,737 | 12/1957 | Kinard et al. ............................ | 408/201 |
| 2,853,904 | 9/1958 | Mackey .................................... | 408/206 |
| 2,972,389 | 2/1961 | Green et al. ............................. | 175/386 |

FOREIGN PATENT DOCUMENTS

| | | |
|---|---|---|
| 8902472 U | 5/1989 | Germany . |
| 3930250 | 3/1991 | Germany . |
| 4141045 | 6/1993 | Germany . |
| 9302487 U | 8/1994 | Germany . |
| 4403906 | 9/1994 | Germany . |
| 189407 | 7/1992 | Japan ...................................... 408/204 |
| 1521839 | 8/1978 | United Kingdom . |

*Primary Examiner*—Daniel W. Howell
*Attorney, Agent, or Firm*—Venable; George H. Spencer; Ashley J. Wells

[57]              ABSTRACT

An annular bit (1) having an attachable center drill (6) is proposed, in which annular bit (1), on the one hand, reliable holding of the center drill (6) in the annular bit (1) is ensured and, in particular, distributions of the cutting segments (3) on the annular bit (1) differing from the 90° symmetry are made possible. This is achieved according to the invention in that the center-drill holder (4) has at least one push-in pin (11) and the wall of the annular bit (1) has at least one recess (14, 15, 16) for accommodating the push-in pin (11), which pin and recess are formed in such a way that the push-in pin (11) is retained in the recess (14, 15, 16) in the axial direction relative to the annular-bit axis in the locked state of the center-drill holder (4).

15 Claims, 5 Drawing Sheets

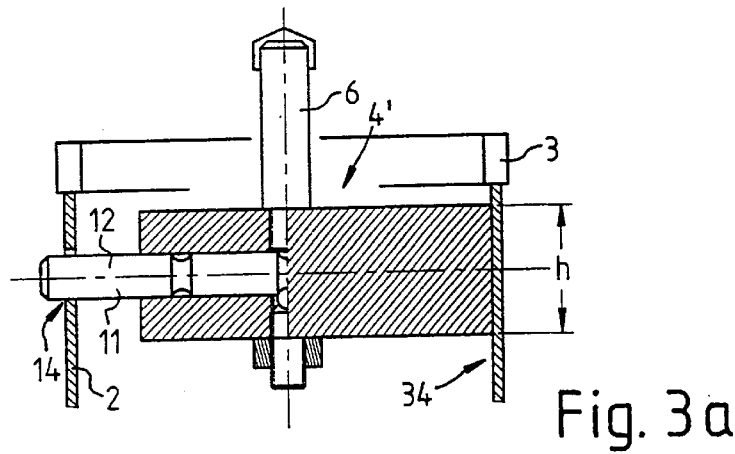
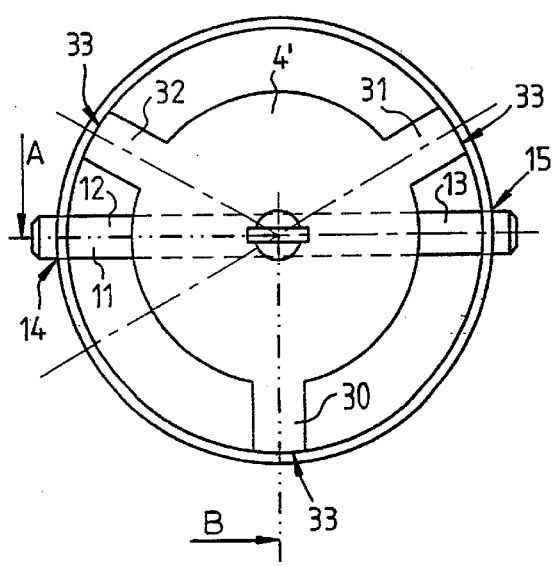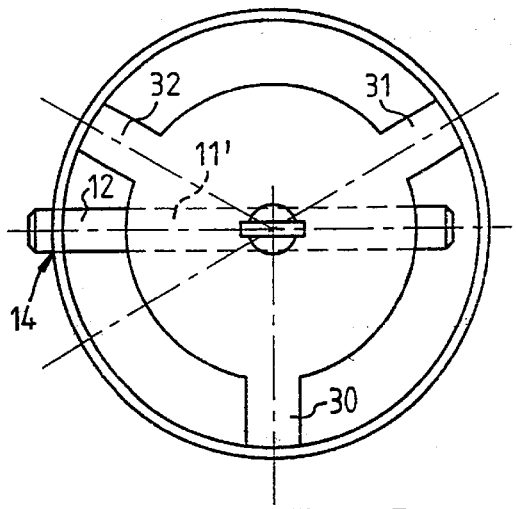

ANNULAR BIT HAVING A CENTER DRILL

The invention relates to an annular bit having a center drill which is attached to a holder which can be fastened in the annular bit.

In annular bits, center drills are often used in order to be able to make the drill hole true-to-size at a desired location. As soon as the annular bit itself has penetrated the material to be drilled, the center drill is no longer required for the locating of the drill hole. In some applications, a center drill in the interior of the annular bit is even undesirable. Therefore annular bits in which the center drill is attached to a holder which is fastened in the annular bit and can be removed again have already been developed and are obtainable on the market. The center drill is inserted into the annular bit at the start of drilling and is removed after the annular bit has penetrated the material to be drilled, which penetration provides external guidance of the annular bit.

The holders of such center drills have holding struts which protrude at right angles and are inserted into corresponding grooves in the wall of the annular bit, running parallel to or at a slight angle to the axis. These grooves are open to the front, i.e. in the direction of the annular-bit side on which the drilling segments are located, so that additional holding of the centering cross in these grooves is necessary. To this end, spring arrangements, for example spring clips, expanded leaf springs or else rubber lobes which can be clamped between holder and drill-hole wall, have been used. In all these cases, satisfactory fixing of the centering cross in the annular bit is not obtained. Furthermore, due to the cross-shaped arrangement of the struts, such a locating cross can only be used in annular bits in which the spacing of the segments permits a 90° distribution of the grooves.

The object of the invention is therefore to propose an annular bit having an attachable center-drill holder, in which annular bit reliable holding and centering of the center drill in the annular bit is ensured and in which a segment distribution of the cutting elements on the annular bit differing from the 90° symmetry is also made possible.

Starting from an annular bit of the type mentioned at the beginning, this object is achieved by providing at least one pin which passes through the holder for the center drill, which pin in turn passes through the wall of the annular bit via at least one recess in such a way that the holder is arrested at least in the axial and/or tangential direction in the locked state.

Advantageous embodiments and developments of the invention are possible by the measures mentioned in the subclaims.

Accordingly, the holder of the center drill of an annular bit according to the invention comprises at least one pin or push-in pin and the wall of the annular bit comprises at least one recess for accommodating the pin. Here, the pin as well as the corresponding recess are formed in such a way that the holder, in the locked state, is arrested both in the axial direction, to prevent falling out, and in the tangential direction, to carry the torque. A pin retained in a recess in such a way forms a positive-locking connection relative to displacements in the axial and tangential directions. The center drill is therefore fixed in the holder in a stable and durable manner when the pin is pushed in and is thus securely fixed in the annular bit, centered and secured for carrying the torque.

In an especially advantageous embodiment, the pin is designed to be displaceable in the holder. In this case, the holder, which preferably comprises a disk-shaped, central holder body, has a corresponding bore for the displaceable accommodation of the pin. To insert the holder into the annular bit, such a displaceable pin can be put into a position in which it can be inserted into the interior of the annular bit without difficulty. The pin is then put into an arrested position, in which, as stated above, it passes through the associated recess and is retained in the axial direction relative to the annular bit.

Catch means, arresting devices or fixing devices or the like are preferably provided for the pin in the holder. In this way, the pin is secured against inadvertent displacement in the holder, whereby inadvertent release of the entire center-drill holder from the annular bit due to such a displacement is likewise prevented.

The catch means or the like advantageously comprise a recess such as a groove, notch or the like at the pin and, if need be, a pressure element which catches in the recess via a compression spring. In a preferred embodiment, the recess is designed as an annular groove in the pin and the pressure element is formed by a ball. The compression spring, which is arranged in a corresponding bore in the holder and, if need be, can be designed in such a way that its spring pressure can be regulated via a prestressing screw, presses on the ball, which in turn comes to lie in the annular groove of the pin in the pushed-in state of the pin. Upon displacement of the pin, so much pressure has to be applied for this displacement operation that the pressure element or the ball leaves the catch recess or the annular groove counter to the spring pressure.

In an advantageous exemplary embodiment, additional retaining recesses, for example retaining grooves, are provided in the pin. If a pin is displaced out of the locking position of the center drill, these retaining recesses or retaining grooves serve to accommodate the pressure element and thus secure the pin against release from the holder.

In an advantageous embodiment of the invention, at least one additional fixing strut is immovably attached to the holder of the center drill, at least one corresponding groove being provided in the annular bit for accommodating the fixing strut. This groove is open at the end face, i.e. on the annular-bit side on which the cutting segments are located, and is wide enough that the fixing strut can be inserted in the axial direction. These grooves may have an angled form like a bayonet catch or even a slanting form. Such a fixing strut together with the corresponding groove fixes the holder of the center drill, in addition to the pin, in the tangential direction of the annular bit. Therefore the pin does not have to absorb all the force arising during the drilling due to the rotation of the annular bit, since at least one additional fixing strut is present here for assistance.

In a particular embodiment, the pin is designed in such a way that it projects from the holder on both sides in the arrested state of the center drill and passes on both sides through a respective recess. In this way, the holder of the center drill is simultaneously secured on two sides by a single pin against axial displacement relative to the axis of the annular bit.

In a particular embodiment, at least one recess for the pin is designed as a closed bore. The pushed-in pin is therefore completely surrounded, and reliably held in a positive-locking manner, by the closed bore.

In the case of a pin projecting on both sides, this form of recess can also be used at both ends of the pin. To release the holder, the pin is displaced to such an extent in one direction that it no longer passes through the corresponding bore on one side and thereby projects further from the annular bit on the opposite side. The holder can then be lifted slightly on the side of the released pin and pulled out of the annular bit at an angle, in the course of which the projecting part of the pin slides through the corresponding bore on the opposite side.

In a further particular, advantageous embodiment, at least one recess for accommodating the pin is designed as an open groove having a cross-sectional reduction. It is therefore possible with likewise at least one corresponding recessed portion in the pin to insert the pin into the groove through the open end of the same. A subsequent transverse displacement likewise displaces the said recessed portion, for example a corresponding annular groove, so that the pin can no longer pass the cross-sectional reduction of the groove and is therefore retained inside the groove in the axial direction.

In advantageous embodiments, combinations of recess forms, i.e. at least one closed bore as well as at least one open groove with cross-sectional reduction, are also conceivable.

Figure 1A:
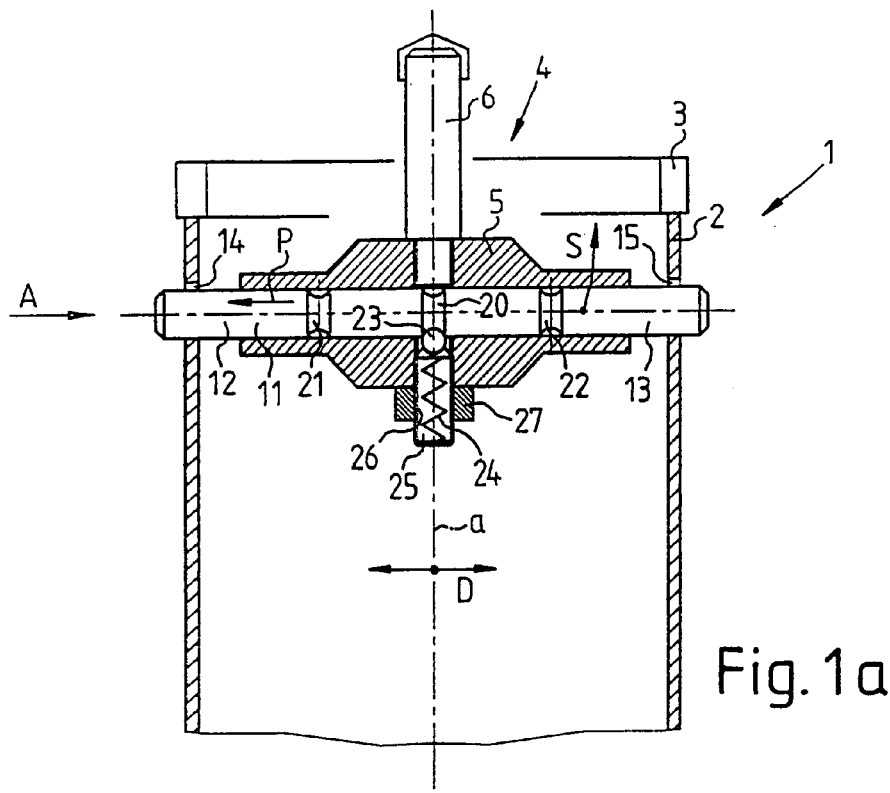
Figure 1B:
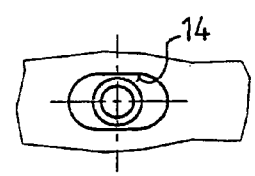
Figure 1C:
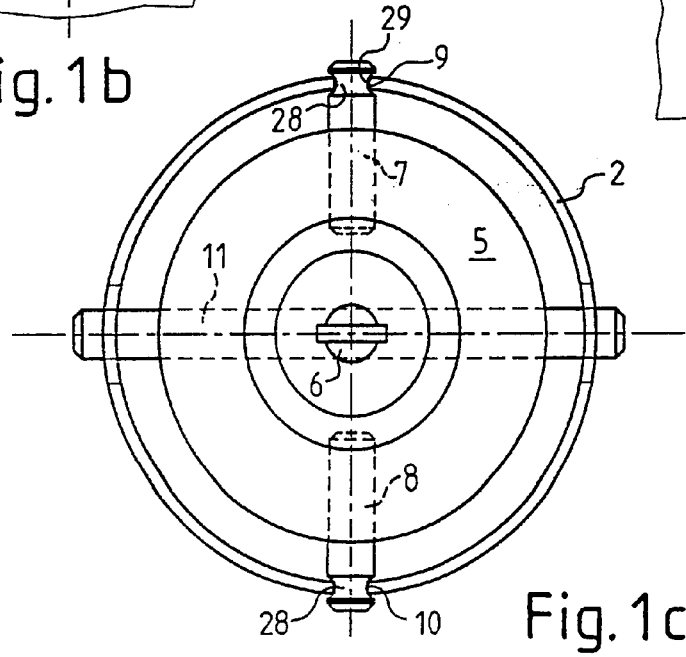
Figure 1D:
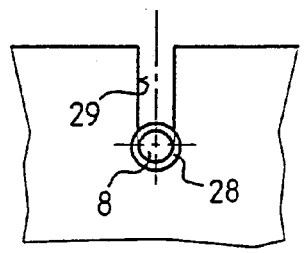
Figure 2A:
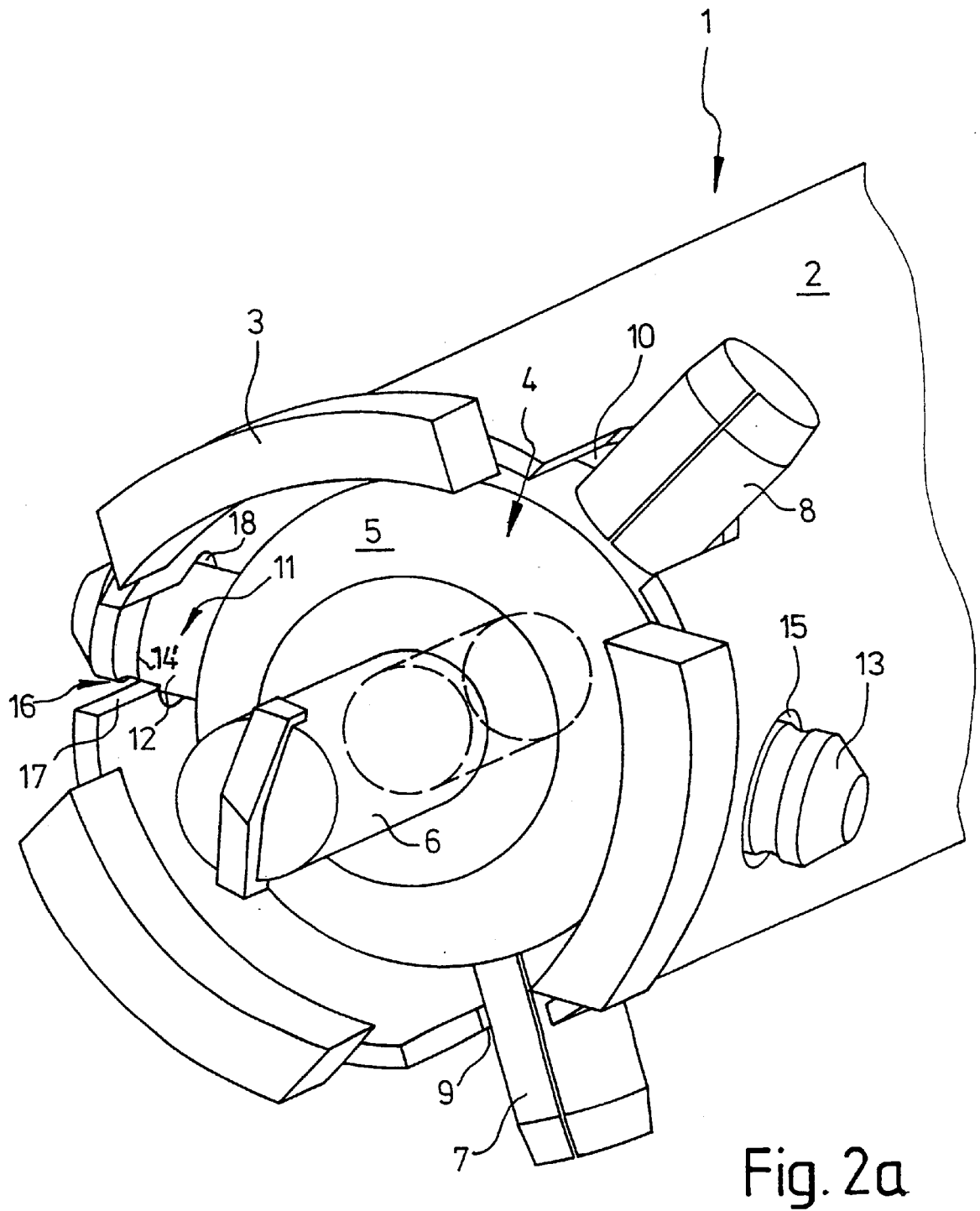
Figure 2B:
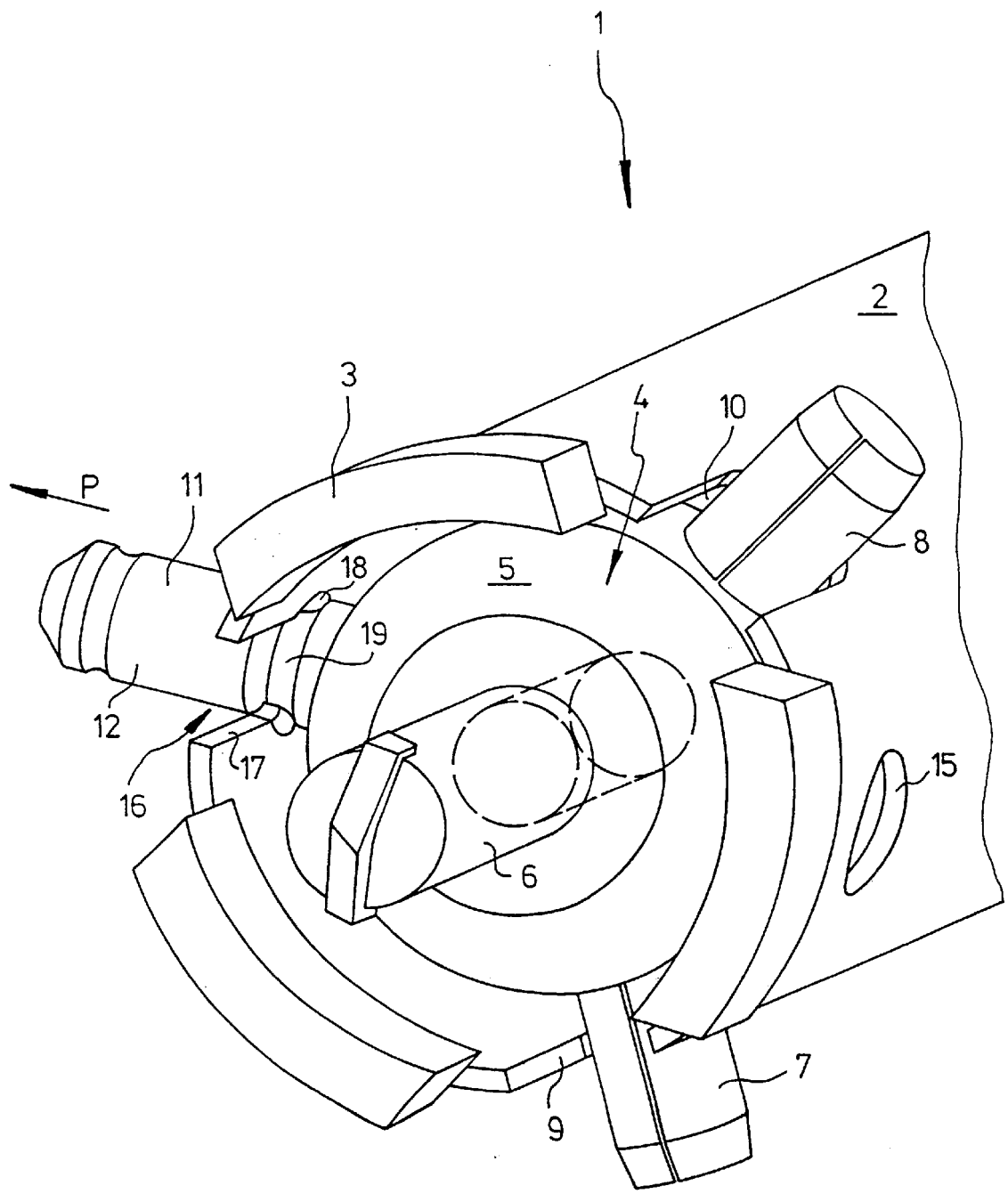

Exemplary embodiments of the invention are shown in the drawing and are explained in more detail below with reference to the figures. In detail:

FIG. 1 shows perspective representation of a first exemplary embodiment of an annular bit according to the invention with the center drill inserted, FIG. 1a shows a cross section through a center-drill holder according to FIG. 1, FIG. 1b shows the view "A" from FIG. 1a, FIG. 1c shows a plan view of the center-drill holder according to FIG. 1a, FIG. 1d shows the view "B" from FIG. 1c, FIG. 2a shows a perspective representation of a further embodiment, FIG. 2b shows an annular bit according to FIG. 2a with the center drill inserted but with the pin in the unlocked state, and FIGS. 3a, 3b, and 3c show further embodiments in side view (FIG. 3a) and plan view (FIGS. 3b, 3c).

The annular bit 1 according to FIGS. 1, 1a, 1c comprises an annular-bit tube 2 as well as cutting segments 3 attached at the end face. The cutting segments 3 in this case are arranged at 90° angles. The center-drill holder 4 according to the invention comprises a central, disk-shaped holder body 5 to which the center drill 6 is fastened. Arranged at the sides at 180°, two fixing struts 7, 8 are provided, which pass through corresponding open grooves 9, 10 in the annular-bit tube 2 and thereby only serve to carry the torque. Arranged at right angles to the fixing struts 7, 8 is a pin or push-in pin 11 which passes through the holder body 5 and, by its fixing ends 12, 13 on both sides, passes through a respective corresponding bore 14, 15 in the annular-bit tube 2 in order to obtain axial fixing.

In the position shown according to FIG. 1, the center drill 6 is firmly fixed in the annular bit 1. On account of the cross-shaped arrangement of the fixing struts 7, 8 and the fixing ends 12, 13 of the push-in pin, no displacements whatsoever are possible in the tangential or radial direction of the annular bit. The center-drill holder 4 is secured against displacement in the axial direction of the annular bit by the fixing ends 12, 13 in the closed bores 14, 15.

To remove the center-drill holder 4, the pin 11 is displaced in one direction, for example in the direction of the arrow P, so that one fixing end, in the example mentioned the fixing end 12, continues to pass through the corresponding bore 14, while the other fixing end, in this case the fixing end 13, leaves the associated bore 15 in the direction of the annular-bit interior. After this one fixing end 13 is released, the center-drill holder 4 can be lifted slightly at an angle to the end face of the annular bit 1 (see arrow S). During this lifting, the two fixing struts 7, 8 are disengaged from the open grooves 9, 10. The center-drill holder 4 can then be removed from the annular bit 1 in a lateral direction, i.e. counter to the arrow P, in the course of which the fixing end 12 then slides through the bore 14 and leaves the latter. The insertion of the center-drill holder 4 takes place in the reverse sequence.

In the exemplary embodiment according to FIG. 2a, both the cutting segments 3 and the fixing struts 7, 8 are respectively distributed at an angle of 120°. The pin 11 is arranged in the center-drill holder 4 in such a way that one fixing end 12 is likewise arranged at an angle of 120° with respect to the fixing struts 7, 8. This fixing end 12 and the fixing struts 7, 8 are therefore each arranged in a gap between the cutting segments 3. The other fixing end 13 lengthens the pin and comes out of the central holder body 5 at 180° relative to the fixing end 12 in order then to pass through a corresponding bore 15 in the annularbit tube 2.

Apart from the angular distribution of 120° of the fixing struts 7, 8 in a manner corresponding to the three cutting segments 3, the present exemplary embodiment according to FIG. 2a also differs by the shaping of the recess 14' for accommodating the fixing end 12. This recess 14' is in turn designed as an open groove 16, the base of the groove 16 being formed by a circle segment 18 which merges into a slot 17 toward the groove opening. Thus an overall shape like a keyhole is formed. Here, the width of the slot 17 is smaller than the diameter of the circle segment 18 and the diameter of the fixing end 12 of the pin 11. Thus the fixing end 12 of the pin 11 is also retained in the groove 16 in the position shown and cannot be pulled out of the groove 16 in the axial direction relative to the annular-bit axis.

The embodiment according to FIG. 2a is shown in the unlocked state in FIG. 2b. The pin 11 is displaced in the direction of the arrow P until an annular groove 19 located in the pin 11 comes to lie in the groove 16 of the annular-bit wall 2. The fixing end 13 of the pin 11 is thereby pulled out of the bore 15 at the same time. The diameter of the annular groove 19 corresponds to the width of the slot 17 or is slightly smaller, so that, in this position, the pin 11 can be removed from the groove 16 in the axial direction of the annular bit 1. In addition, since the fixing end 13 is released from the closed bore 15, the center-drill holder 4 can be pulled out without difficulty in the axial direction relative to the annular-bit axis. The insertion of the center-drill holder 4 again takes place in the reverse sequence.

In the cross-sectional representation according to FIG. 1a and in the associated plan view according to FIG. 1c, it can be seen that the pin 11, which passes through the holder body 5, has, in addition to a central annular groove 20, two further annular grooves 21, 22, which are each designed as a type of arresting groove. Pressed into the central annular groove 20 is a ball 23, which is pressed against the annular groove 20 via a compression spring 24. The compression spring 24 is located in the interior of a hollow screw 25 which is screwed into a corresponding thread 26 of the holder body 5 and is secured via a lock nut 27. The compression spring 24 can be stressed, and thus the pressure on the ball 23 varied, by adjusting the hollow screw 25.

The push-in pin 11 can be displaced in the direction of the double arrow D by pressing on one of its fixing ends 12, 13. In this case, so much pressure has to be applied that the ball 23 is pressed out of the annular groove 20 counter to the pressure of the compression spring 24. Here, a pressure point arises, and after this pressure point is overcome the pin 11 is easily displaceable. As soon as one of the arresting grooves 21, 22 reaches the level of the ball 23, the ball 23 catches in the corresponding annular groove 21, 22. This avoids a situation in which the pin 11 is pulled completely out of the holder body 5 or can slide out inadvertently, so that the annular grooves 21, 22 each form a type of retaining groove.

In order to bring back the pin 11 into the position shown according to FIGS. 1, 1a, the reverse procedure is followed until the ball 23 catches in the central annular groove 20 again. The mechanism presented constitutes a permanently operational and mechanically loadable solution for reliable catching of the pin 11. In this case, the center-drill holder 4 can be removed from the annular bit 1 quickly and without an additional tool.

At the same time, however, the center-drill holder 4 is secured against all possible movements, in particular against axial displacement relative to the axis a of the annular bit 1, in the locked state of the pin 11.

In an alternative embodiment, the bore 14 according to the representation in FIGS. 1, 1a, 1b may be designed as an elongated hole widening in the transverse direction, in order to permit a certain amount of tangential and radial backlash. In the axial direction, however, the fixing end 12 is to be arranged in the bore 14 as far as possible without backlash.

According to the representation in FIG. 1c with the detail according to FIG. 1d (view from "B" in FIG. 1c), the ends of the fixing struts 7, 8 may have an arrangement with an additional annular groove 28 and longitudinal slot 29 in order to obtain additional radial fixing by positive-locking interaction of the annular groove 28 and the longitudinal slot 29. Otherwise, the fixing rods 7, 8—as described above— serve to carry the torque.

A further exemplary embodiment is represented in FIGS. 3a to 3c, FIG. 3a showing a section along section line A–B in FIG. 3b.

The special feature of the embodiment according to FIGS. 3a, 3b consists in the fact that the fixing struts 7, 8 in the exemplary embodiments described above are dispensed with. According to the representation in FIGS. 3a, 3b, the center-drill holder 4' has a pin 11 which is arrested by its fixing end 12 in a first bore 14 of the annular-bit tube 2 and by its other fixing end 13 in the opposite bore 15 of the annular-bit tube 2. The radial fixing and holding of the pin 11 follows according to the same principle and according to the same arrangement as shown in the representation according to FIG. 1a and as described in relation to this. You are referred to the additional statements made there.

However, in order to dispense with the fixing struts 7, 8 from FIGS. 1, 1a, 1c, the center-drill holder 4' according to FIGS. 3a, 3b is provided with three vanes 30, 31, 32 which are arranged at an angular distance apart of 120° and extend over a height section h. The radial outer walls 33 of the vanes 30 to 32 form cylinder sections of height h, which are supported in a 35 positive-locking manner on the inner wall 34 in such a way that a tilting movement of the center-drill holder 4' is effectively avoided. The center-drill holder 4' is therefore supported in a positive-locking manner by its vanes 30 to 32 on the inner wall 34 of the annular-bit tube 2 in such a way that exact fixing inside the annular-bit tube is ensured. The task of the pin 11 in this exemplary embodiment is therefore axially to secure and fix the center-drill holder inside the annular-bit tube and to carry or transmit the torque from the center drill 6 to the annular-bit tube 2.

In principle, the center-drill holder 4' is exchanged in the same way as with respect to FIGS. 1, 1a, 1c, the pin 11 accordingly being displaced radially or removed from the bore. The advantage of the arrangement according to FIGS. 3a, 3b lies in the fact that the top rim area of the annular bit may be designed completely independently without axial longitudinal slots being required for accommodating the fixing struts 7, 8.

In the exemplary embodiment according to FIG. 3c, use is made of a shortened pin 11' which passes by one fixing end 12 through the associated bore 14 only on one side and thus ensures axial securing and carrying of the torque. This fixing of the pin 11' with only one bore 14 may be quite sufficient on account of the inner support by the vanes 30 to 32.

The invention is not restricted to the exemplary embodiment shown and described. On the contrary, it also comprises all modifications within the scope of the claims.

We claim:

1. An annular bit (1) having a center drill (6), the center drill (67) being attached to a holder (4) which can be fastened in the annular bit (1), wherein at least one pin (11) passes through the holder (4) for the center drill (6), which pin (11) in turn passes through the wall (2) of the annular bit (1) via at least one recess (14, 15, 16) in such a way that the holder (4) is arrested at least in the axial direction when being secured from displacement.

2. The annular bit as claimed in claim 1, wherein the pin (11) is radially displaceable inside the holder (4) and can be fixed in a certain position using fixed ends (12, 13) of the pin.

3. The annular bit as claimed in claim 1, wherein catch means (20, 23, 24) are provided for catching the pin (11) inside the holder (4).

4. The annular bit as claimed in claim 3, wherein the catch means supported by the holder comprises a pressure element, a catch recess supported by the pin, and a compression spring supported by the holder.

5. The annular bit as claimed in claim 1, wherein at least one annular groove (21, 22) is provided on the pin (11) for the arresting or radial fixing the displacement pin.

6. The annular bit as claimed in claim 1, wherein at least one fixing strut (7, 8) is provided on the holder (4) together with at least one corresponding axial, open groove (9, 10) for accommodating the fixing strut in the annular-bit wall (2).

7. The annular bit as claimed in claim 1, wherein the pin (11) projects from the holder (4) on both sides in the locked state and in this case passes on both sides through a respective recess (14, 15, 16) in the annular-bit tube (2).

8. The annular bit as claimed in claim 1, wherein at least one recess (14, 15, 16) in the annular-bit tube (2) is designed as a closed bore of circular cross section (14, 15) or rectangular or square cross section or of circle-segment cross section (18) with adjoining groove (17).

9. The annular bit as claims in claim 1, wherein at least one recess (16) in the annular bit tube (2) is an open groove having a cross-sectional reduction (17, 18) and wherein the width of the groove reduces over the cross-sectional area of the groove.

10. The annular bit as claimed in claim 1, wherein at least one recess (16) is a groove having a slot-shaped cross-sectional area reduction (17, 18) adjoining a circle segment (18) and wherein the width of the slot-shaped portion is less than the diameter of the circle segment.

11. The annular bit as claimed in claim 1, wherein the pin (11) and the fixing struts (7, 8) enclose an angle of 120° of the annular bit, and wherein at least three grooves (9, 10, 16) open at the top of the annular bit tube are provided for the pin (11) and the fixing struts (7, 8), respectively.

12. The annular bit as claimed in claim 1, wherein the center-drill holder (4') has a pin (11, 11') which passes transversely through the center-drill holder (4') and passes through at least one recessed portion (14, 15) in the annular-bit tube (2), and wherein the holder (4') has three radially and symmetrically extending vanes (30, 31, 32) which have an axial wall section (33) of height (h), the height (h) being dimensioned in such a way that the holder (4') is supported in a manner on the inner wall (34) of the annular-bit tube in such a way as to be secured against tilting.

13. The annular bit as claimed in claim 1, wherein the holder is arrested in the tangential direction to the annular bit when being secured from displacement.

14. The annular bit claimed in claim 4, wherein said catch recess is an annular groove.

15. The annular bit claims in claim 4, wherein said pressure element is a ball.

\* \* \* \* \*